United States Patent Office

3,627,537
Patented Dec. 14, 1971

3,627,537
SOY FOOD PRODUCT
Charles I. Beck, Wayzata, and Patricia D. Cummisford, Minneapolis, Minn., assignors to General Mills, Inc.
No Drawing. Filed Feb. 9, 1970, Ser. No. 9,942
Int. Cl. A23l 1/20
U.S. Cl. 99—98                                    11 Claims

ABSTRACT OF THE DISCLOSURE

A food product is described which includes a soy material and a flavor modifying agent. The flavor modifying agent may be citrus peel, an extract from citrus peel or a terpene. The flavor modifying agent is used in an amount sufficient to reduce or eliminate the characteristic soy taste of the food product and yet below the level at which the flavor of the agent itself is recognizable.

BACKGROUND OF THE INVENTION

The present invention relates to food products and more particularly to food products containing a soybean material such as soybean flour.

A large portion of the world's population today is undernourished due to inadequate diet, and projected population figures indicate that this population segment will increase. Protein is one of the principal deficiencies in the diet of these persons. For example, the amount of meat available, particularly in the very heavily populated countries of the world, is at best limited. Furthermore, the cost of meat, when available, is beyond the reach of many persons. Thus, a need exists for a low cost, readily available protein dietary food product.

Varous soybean food products provide material of high protein content and high nutritive value. The interest in soybean products as supplements and replacements for other dietary proteins has noticeably increased in recent years. Typical examples of such soybean food products would include soy flour, soy meal, and products made from such flour or meal such as bread-like foods. Soy food products contain characteristics that are highly desirable in dietary protein supplements. Soy food products are relatively inexpensive and thus can be economically available to persons of low income. Soy food products can be provided in a dry form and therefore can be stored for extended periods without refrigeration. Soy food products in the past, however, have possessed a certain disadvantage which has substantially reduced their use. Generally, soy food products have a characteristic soy taste, sometimes described as a beany taste. Many people find this taste objectionable.

In the past much research effort has been expended in order to find a method for reducing or eliminating the characteristic taste of the soy food products. For example, it has been suggested that the soybeans be sprouted and thereby reduce the soy taste. Another illustrative approach is that of treating soybeans with infrared radiation in order to reduce the soy taste. Although many of the proposed methods of reducing the soy taste have been effective to a degree, they have not eliminated the problem. Also the known methods suffer from various disadvantages such as being complex and/or expensive.

GENERAL DISCUSSION OF THE INVENTION

The present invention provides highly desirable soybean based food products in which the characteristic soy taste is substantially reduced or even eliminated. In the present invention the soy material is modified by the addition thereto of a flavor modifying agent, typically, a citrus material, such as whole citrus peel, citrus oil, or an extract from such peel or oil.

One preferred soy food product of the present invention is a crouton; however, the present invention would also include other types of soy food products having various amounts of soy protein present, for example snacks, confections, cookies, beverages, bread, food products including heat coagulable soy protein, and the like. The croutons will include soy flour and a flavor modifying agent such as orange peel. The crouton may include other materials such as wheat flour, non-citrus flavoring and sodium chloride. The croutons, typically, may be produced by adding water to the other ingredients thereby forming a dough, extruding the dough to form an expanded, elongated rope and then cutting the rope into short segments.

The preferred croutons contain about 45 parts of soy flour based on 100 parts of total flour by weight (parts and percentages as used herein will be by weight unless otherwise indicated). The balance of the flour may be wheat flour or any other type of cereal flour. The croutons will also include a flavor modifying agent, such as citrus material in an amount below the level at which the food product has a recognizable flavor of the modifying agent; for example, up to 1 part of the orange peel composition of Example I per 100 parts total flour.

One type of extruder which has been found highly satisfactory in producing the preferred croutons of the present invention is shown and described in U.S. Pat. No. 3,117,006 and is manufactured by Wenger Manufacturing Inc. of Sabetha, Kan., under the designation X–25. Such an extruder was used in the following examples and included an arrangement for metering dry feed to the rear of a power screw series. The power screw series included a standard rear screw, a single section mid screw and a forward cone screw. Steam dams were provided between adjacent screws. The power screw series during preparation of the croutons was operated at about 300 r.p.m. The flour mixture was passed into the extruder at a rate of about 5 pounds per minute. The flour was mixed with water at the rear end of the rear screw thus forming a dough. The water was added at the rate of about 750 milliliters per minute. The extruder used to produce the croutons described in the following examples was provided with three water-cooled temperature control jackets. The temperature of the water leaving the jackets was 50° F., 70° F., and 90° F., respectively, from feed end to extrusion end of the extruder. The die, used to produce the circular croutons described in Examples I–V, was a circular venturi die having a diameter of between ¼ and $\frac{5}{16}$ inch. The croutons in Example VI were produced using a shaped die which resulted in square croutons. The die plate temperature in each case was about 220° F.

Of course, other types of dies and extruders may be used if desired. The screws apply pressure and work to the dough as the dough passes through the extruder. Heat and steam is created within the dough, thereby cooking the dough. The steam produces substantial pressure within the dough and the dough expands upon release from the die.

Dough, in the following examples, was extruded in the form of a rope which had a diameter of ½ inch. The rope, if desired, may be of other sizes. In the following examples, the rope was cooled at room temperature for 30 seconds following extrusion and then cut into pieces approximately ½ inch in length. The pieces were allowed to dry for about 20 hours at room temperature. The dried pieces, which contained about 10% water, were deep fat fried in coconut oil at 356° F. for about 20 seconds. The croutons were then oven toasted for about 12½ minutes at 350° F. Frying and toasting of the croutons gives them an even brown color and makes them crunchy throughout. The pieces were then cooled at room temperature for between 3 and 4 hours. The resulting crouton may be used for any of many applications, for example, as breading material, as a base for stuffing, as a soup or salad crouton, as a snack, as a confection, or as a topping for vegetable casseroles.

The flavor modifying agent of the present invention includes citrus materials and terpenes. The term "citrus material" as used herein will refer to the peel of various citrus fruits such as orange, lemon, grapefruit, etc. The term "citrus material" will also refer to citrus peel extracts such as citrus oil. The term "terpenes" as used herein will refer to various essential oils from plant material, for example, acyclic terpenes, such as citral and linalool, and cyclic terpenes, such as limonene and dipentene and dicyclic terpenes, such as 1,2-pinene and 2-pinene as well as isomers of such compounds. The flavor modifying agent should be used in an amount sufficient to reduce or eliminate the characteristic soy taste and in an amount below that at which the flavor of the flavor modifying agent is recognizable. The flavor of the agent is considered recognizable when the average individual is able to detect and identify the flavor of the agent. In other words, the flavor modifying agent is used to reduced the soy taste in the food product rather than to produce its own flavor in the food product. The amount of favor modifying agent necessary, as well as the amount permissible, will vary somewhat depending upon such factors as the protein content of the soy material, the amount of flavoring and spices present, the particular food product, and the particular flavor modifying agent used. Typical levels at which the mentioned flavor modifying agents may be used, based on the dry weight of the soy material described in Example I, are as follows: Ground orange peel (basis dry weight of peel solids) from 0.025 to 0.5%, preferably about 0.08%; citrus oil from 0.005 to 0.1%, preferably about 0.02%; di-limonene from 0.0025 to 0.05%, preferably about 0.1%; citral from 0.001 to 0.01%, preferably about 0.025%; and linalool from 0.001 to 0.01%, preferably about 0.0025%. Thus, the flavor modifying agents were found to be effective even in very small amounts.

Example I

Croutons were prepared by extrusion using 45 parts soy flour of the type known as Soya Bits and produced by Central Soya Co. under the designation 20AW (containing 55% soy protein), 55 parts wheat protein concentrate, ½ part sodium chloride, ⅓ part orange peel composition and between 28 and 35 parts water. The wheat protein concentrate was a product of Bay State Milling Co. The dry ingredients first were blended, then water was added to the dry ingredients in the extruder. The orange peel composition contained about 12% orange peel solids, 26% glycerine, 26% dextrose, 26% soybean oil and 10% moisture. The orange peel composition was previously ground to a particle size of about U.S. No. 10 sieve mesh. The dough was extruded into the form of a puffed rope circular in cross section and having a diameter of ½ inch. The rope was cooled at room temperature for 30 seconds following extrusion and then cut into pieces approximately ½ inch in length. The pieces were dried at room temperature for 20 hours. The dried croutons, containing about 10% water, were dipped in coconut oil at about 350° F. for 20 seconds. The croutons were then oven toasted for about 12½ minutes at 350° F. and then cooled at room temperature for between 2 and 3 hours. The toasted croutons were found to have much less soy taste than control croutons prepared in an identical manner except without the citrus peel composition.

Example II

Three samples of croutons, II–A through II–C, were prepared by extruding a mixture containing 100 pounds of wheat flour, 80 pounds of soy flour, and 0.9 pound of salt. The wheat flour was a hard wheat, second clear flour produced by General Mills, Inc. under the designation Oxbow. The soy flour was defatted, untoasted soy flour having a protein content of about 55% on dry weight basis and marketed by Archer Daniel Midland Co. under the designation Nutrisoy. The dry mixture was mixed with about 65.5 pounds of water in the extruder. Sample II–A is one preferred embodiment of the present invention and contained 30 grams of orange oil in each 200 pounds of dry mixture. Sample II–B, another preferred embodiment of the present invention, contained 10 grams of orange oil in each 200 pounds of dry mixture. Sample II–C was a control and did not contain any flavor modifier. The orange oil used in Samples A and B was of a type produced by Norda Essential Oil & Chemical Co. Inc. under the designation No. W-4268. Although the orange oil was labeled "terpeneless," the orange oil only had about 60% of the terpenes removed. The croutons were taste tested by a panel of five persons known to be capable of recognizing the characteristic taste of the soy materials. The panel members were also known to object to the soy taste. The samples II–A, II–B and II–C were placed in separate paper cups, each sample being identified by a code symbol. The panel members were asked to rank the samples in order of preference. The samples were given a score of 3 points for each first place preference, 2 points for each second place preference and 1 point for each third place preference. Sample II–A received a score of 13 points, Sample II–B received a score of 12 points and Sample II–C, which was the control, received only 5 points.

Example III

Three samples of croutons, Samples III–A through III–C were prepared substantially as described in Example II except that the orange oil was replaced with linalool, which has a formula of $C_{10}H_{18}O$ and is also known as 3,7-dimethyl-1,6-octadiene-3-ol. Sample III–A contained 5 grams of linalool per 200 pounds of dry mixture. Sample III–B contained 1 gram of linalool per 200 pounds of dry mixture and Sample III–C was the control and did not contain and flavor modifying agent. The linalool was produced by Eastman Organic Chemicals under the designation DPI No. 861. The crouton Samples III–A through III–C were taste tested as described in Example II. Sample III–A scored 14 points, Sample III–B scored 11 points and the control, Sample III–C, scored 5 points.

Example IV

Croutons were prepared substantially as described in Example II except that the orange oil was replaced with citral, which has the general formula $C_{10}H_{16}O$ and is a mixture of geranial and neral (the two geometric isomers). Sample IV–A contained 5 grams of citral per 200 pounds of dry mixture. Sample IV–B contained 1 gram of citral per 200 pounds of dry mixture. The control, Sample IV–C, did not contain a flavor modifying agent. The citral was produced by Eastman Organic Chemicals under the designation DPI No. P932. The Samples IV–A through IV–C were taste tested by the panel as described in Example II. Sample IV–A scored 11 points, Sample IV–B scored 13 points and the control, Sample IV–C, scored 6 points.

Example V

Croutons were prepared as described in Example II except that the orange oil was replaced with d-limonene. Limonene has the general formula $C_{10}H_{16}$. Sample V–A contained 25 grams d-limonene in 200 pounds of dry mixture. Sample V–B contained 5 grams d-limonene in 200 pounds of dry mixture. Sample V–C was a control and did not contain a flavor modifying agent. The limonene was produced by Eastman Organic Chemicals under the designation DPI No. 1980. Samples V–A through V–C were taste tested by the panel as described in Example II. Sample V–A scored 11 points, Sample V–B scored 12 points and Sample V–C scored 7 points.

Example VI

Croutons were prepared by extruding a mixture containing 101 pounds of wheat flour, 82 pounds soy flour, 0.9 pound of sodium chloride and about 73.5 pounds of water. The croutons were ½ inch square. Sample VI-A contained 2 ounces of formulated lemon flavoring per 200 pounds of dry mixture. The wheat flour was a soft wheat, second clear flour produced by General Mills, Inc. under the designation "Golden Crust." The soy flour was a defatted, untoasted soy flour marketed by Archer Daniels Midland Co. under the designation Nutrisoy. The lemon flavoring was produced by International Flavors & Fragrances, Inc. under the designation V-14, 305 and contained ingredients found in natural citrus peel such as d-limonene, linalool and citral. Sample VI-B contained 1 ounce of formulated orange flavoring per 200 pounds of dry mixture. The formulated orange flavoring was prepared by International Flavors & Fragrances, Inc. under the designation V-14, 667 and contained ingredients found in natural citrus peel such as linalool and limonene. Sample VI-C was the control and did not contain citrus material. Samples VI-A through VI-C were taste tested as described in Example II. Sample VI-A scored 11 points, Sample VI-B scored 13½ points and the control scored 5½ points. The ½ point score indicates a tie situation in preference.

Example VII

This example illustrates the use of the present invention in the form of a soy beverage. Sample VII-A is one preferred embodiment of the present invention and was prepared by dispersing 100 grams of Nutrisoy and 0.025 milliliter of orange oil (orange oil USP, California Cold Pressed, Sunkist Growers, Inc.) in 900 milliliters of cold water. Eleven grams of a 50% aqueous solution of sodium hydroxide was added and the mixture was stirred for 15 minutes. The final pH was 12.2. Twelve milliliters of a 50% aqueous solution of citric acid was added to the mixture over a period of 4 minutes during continuous stirring. The ingredients, prior to addition, were at room temperature except for the water which was about 50° F. Sample VII-A was then freeze dried. Sample VII-B was identically prepared except that it contained 0.100 milliliter of the orange oil. Sample VII-C was prepared in a manner identical to Sample VII-B except that the preparation was carried out at 170° to 180° F. Sample VII-D was prepared by dispersing 200 grams of Nutrisoy in 1800 milliliters of cold water. Twenty-two grams of a 50% aqueous solution of sodium hydroxide was added and mixed for 10 minutes. The final pH was 10.8. Twenty-three milliliters of a 50% aqueous solution of citric acid was added over a period of five minutes during continuous stirring. The final pH was 8.0. Two-tenths of a milliliter of the orange oil were added and dispersed. Sample VII-D was spray dried. Sample VII-E was the control and was prepared identical to Sample VII-A except that it did not contain orange oil.

A beverage was prepared from each of the Samples VII-A through VII-E by dispersing 6 grams of the soy material and 10 grams of Hershey's Instant Genuine Chocolate Flavor in 180 grams of whole milk. The ingredients were mixed in a Waring Blender for 2 minutes at low speed. The resulting Beverage Samples VII-A through VII-E were taste tested as described in Example II except the panel consisted of eight persons. The beverages were given a score of 5 points for each first place preference, 4 points for each second place, 3 points for third place, 2 points for fourth place and 1 point for fifth place preference. The control, Beverage Sample VII-E scored only 16 points, whereas Beverage Sample VII-A scored 28½ points (half points indicate a tie situation). Beverage Sample VII-B scored 22½ points. Beverage Sample VII-C scored 28 points and Beverage Sample VII-D scored 25 points. Five of the eight panel members selected the control as the least desirable beverage.

Example VIII

This example illustrates the use of the present invention in the form of a heat coagulable soy protein of a type which may be used as a substitute for egg white in angel food cakes. Sample VIII-A was prepared by mixing for 1½ hours a mixture including, by weight, 7.5 parts egg material, 85 parts water and 7.5 parts soy material. The egg material was produced by Tranin Co. under the designation "Heat Treated Egg Solids." The soy material was Nutrisoy modified in a manner identical to the freeze dried Sample VII-B of Example VII. Sample VIII-A was autoclaved for 10 minutes at 250° F. and then cooled. The resulting material looked and tasted much like coagulated egg white. Sample VIII-B was prepared in an identical manner to Sample VIII-A except the soy material was the freeze dried soy material of Sample VII-E which did not contain a flavor modifying agent. Sample VIII-C was prepared in an identical manner to Sample VIII-B except that 0.002 milliliter of the orange oil (orange oil USP, California Cold Pressed, Sunkist Growers, Inc.) were added to each 90 grams of the mixture of soy material, egg material and water, thus having 0.025% orange oil based on the dry weight of soy material. Sample VIII-D was prepared in an identical manner to Sample VIII-C except that 0.006 milliliter of the orange oil were added to each 90 grams of the mixture of soy material, egg material and water, thus having 0.76% orange oil based on the dry weight of soy material. The heat coagulated Samples VIII-A through VIII-D were taste tested by a panel of 10 persons. The panel members were asked to rate the samples in order of their preference. The samples were given 4 points for each first place preference; 3 points for second place; 2 points for third place and 1 point for each fourth place preference. The control, Sample VIII-B scored only 18 points, whereas one preferred embodiment, Sample VIII-A scored 28½ points. Sample VIII-C scored 23½ points and Sample VIII-D scored only 20 points because of detection of orange flavor.

The embodiments of the invention in which an exclusive property or privilege is claimed are defined as follows:

1. A food product comprising soy material and a flavor modifying agent selected from the group consisting of terpenes and citrus peel material, said agent being present in an amount sufficient to reduce the soy flavor and in an amount below that at which the food product has a recognizable flavor of the agent.

2. The food product of claim 1 wherein the flavor modifying agent is present in an amount of from 0.001 to 0.5 percent by weight based on the dry weight of the soy material.

3. The food product of claim 2 wherein the flavor modifying agent is a member selected from the group consisting of citrus peel, citrus oil, linalool, citral, pinene and limonene.

4. The food product of claim 1 wherein the citrus material is citrus oil and wherein said citrus oil is present in an amount of from 0.005 to 0.1 percent by weight based on the dry weight of the soy material.

5. The food product of claim 3 wherein the citrus material is ground orange peel and wherein said peel is present in an amount of from 0.025 to 0.5 percent by weight based on the dry weight of the orange peel solids and dry weight of the soy material.

6. The food product of claim 3 wherein the terpene is d-limonene and wherein said d-limonene is present in an amount of from 0.0025 to 0.05 percent by weight based on the dry weight of the soy material.

7. The food product of claim 3 wherein the terpene is citral and wherein the citral is present in an amount of from 0.001 to 0.01 percent by weight based on the dry weight of the soy material.

8. The food product of claim 3 wherein the terpene is linalool and wherein the linalool is present in an amount of from 0.001 to 0.01 percent by weight based on the dry weight of the soy material.

9. The food product of claim 1 wherein said food product comprises an extruded, expanded crouton including about 45 parts soy flour and up to 1 part dry ground citrus peel composition by dry weight based on 100 parts total flour.

10. The food product of claim 1 wherein said product comprises a soy beverage.

11. The food product of claim 1 wherein said food product includes a heat coagulable soy protein.

References Cited

De Gouy, Louis P., The Bread Tray, Greenburg Publishing Company, 1946, p. 423.

A. LOUIS MONACELL, Primary Examiner

W. A. SIMONS, Assistant Examiner